(12) United States Patent
Hirano

(10) Patent No.: US 8,506,419 B2
(45) Date of Patent: Aug. 13, 2013

(54) GOLF CLUB HEAD AND METHOD FOR MANUFACTURING THE SAME

(75) Inventor: Tomoya Hirano, Kobe (JP)

(73) Assignee: SRI Sports Limited, Kobe (JP)

( * ) Notice: Subject to any disclaimer, the term of this patent is extended or adjusted under 35 U.S.C. 154(b) by 479 days.

(21) Appl. No.: 12/788,953

(22) Filed: May 27, 2010

(65) Prior Publication Data

US 2010/0317460 A1 Dec. 16, 2010

(30) Foreign Application Priority Data

Jun. 12, 2009 (JP) .................................. 2009-141691

(51) Int. Cl.
*A63B 53/04* (2006.01)
(52) U.S. Cl.
USPC ............ 473/324; 473/342; 473/345; 473/409
(58) Field of Classification Search
USPC .......................... 473/324–350, 287–292, 409
See application file for complete search history.

(56) References Cited

U.S. PATENT DOCUMENTS

| 3,679,866 | A | * | 7/1972 | Arikawa et al. | ............ 219/137 R |
| 4,219,720 | A | * | 8/1980 | Moench | .................... 219/121.35 |
| 5,024,437 | A | * | 6/1991 | Anderson | ..................... 473/342 |
| 5,250,783 | A | * | 10/1993 | Nishi et al. | ................ 219/121.64 |
| 6,545,247 | B2 | * | 4/2003 | Mukasa et al. | ........... 219/121.63 |
| 7,396,297 | B2 | * | 7/2008 | Hirano | ........................... 473/345 |
| 8,246,489 | B2 | * | 8/2012 | Yamamoto | ..................... 473/346 |
| 2006/0135286 | A1 | * | 6/2006 | Imamoto et al. | .............. 473/342 |

FOREIGN PATENT DOCUMENTS

JP 2008-173293 A 7/2008

\* cited by examiner

*Primary Examiner* — Sebastiano Passaniti
(74) *Attorney, Agent, or Firm* — Birch, Stewart, Kolasch & Birch, LLP

(57) ABSTRACT

A golf club head having a club face for hitting a ball comprises a hollow main body provided with a front opening, and a face member disposed at the front of the main body so that a front surface thereof forms at least a major part of the club face, and a rear surface thereof faces a hollow of the main body. The peripheral edge of the face member is welded to the main body so as to form a weld bead, and the width of the weld bead is changed so that a difference (Wmax−Wmin) between the maximum width Wmax and minimum width Wmin is not less than 1 mm.

19 Claims, 11 Drawing Sheets

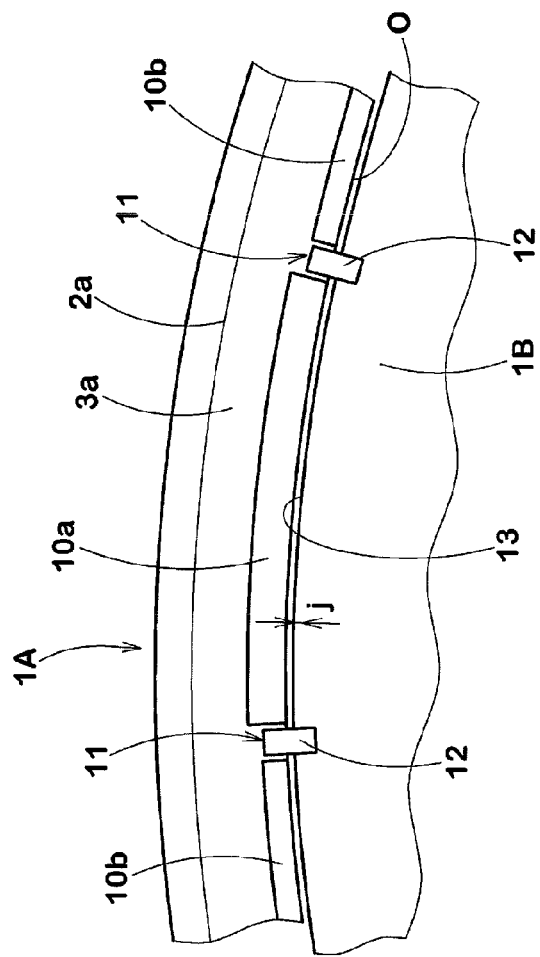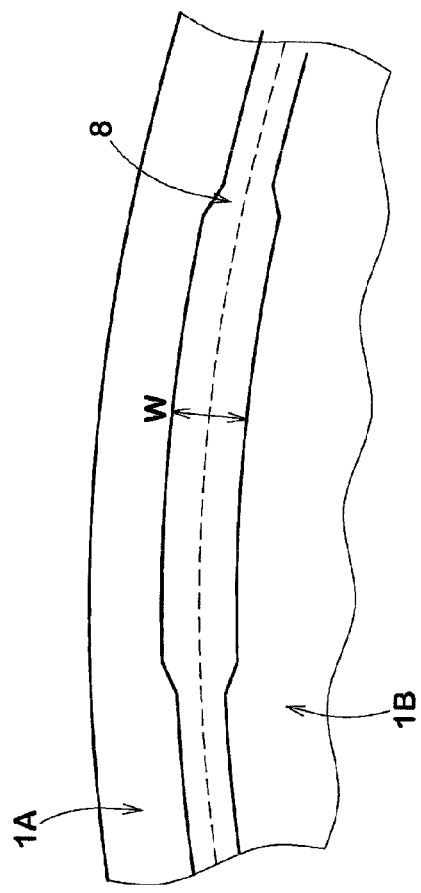
FIG.7
FIG.12

E1 section

GOLF CLUB HEAD AND METHOD FOR MANUFACTURING THE SAME

BACKGROUND OF THE INVENTION

The present invention relates to a golf club head and a method for manufacturing the same, more particularly to a method for welding a face member to a main body of the golf club head.

A golf club head having a front opening closed by a face plate or face member is well known in the art, for example, as disclosed in Japanese parent application publication No. 2008-173293.

In recent years, on the other hand, a welding robot is widely used in the processes for manufacturing various industrial products including golf club heads.

In the case of a product in which it is difficult to remove a protruding part of the weld bead because the protruding part is formed inside the product and hard to access after welded, fundamentally, the welding robot is programmed such that a uniform weld bead is formed along the welding seam with a small protruding part protruding inside the product. Therefore, there is a possibility of making the protruding part overly small, and in the worst case, the joint strength becomes insufficient. Hollow golf club heads such as wood-type hollow metal golf clubs are just such a product.

The present inventor changed in thinking so as to make active use of a weld bead in order to improve performance of the golf club head while increasing the joint strength at the same time, and the present invention was accomplished.

SUMMARY OF THE INVENTION

It is therefore, an object of the present invention to provide a golf club head and a method for manufacturing the same, in which the face member is welded to the main body and the weld bead is utilized to improve performance of the golf club head and the weld joint strength at the same time.

According to one aspect of the present invention, a golf club head having a club face for striking a ball comprises a hollow main body provided with a front opening, and a face member disposed at the front of the main body so that the front surface thereof forms at least a major part of the club face, and a rear surface thereof faces a hollow of the main body, wherein a peripheral edge of the face member is welded to the main body so as to form a weld bead, and the width of the weld bead is changed so that a difference between the maximum width and minimum width is not less than 1 mm.

It is preferable that the weld bead is provided with the above-mentioned maximum width in a part under the sweet spot so that the resultant relatively wide part extends along a lower edge of the face portion of the golf club head.

In this case, due to the wide part, an additional weight is provided in the lower part of the head. Thus, it is possible to lower the position of the center of gravity of the head. Further, as the weld joint strength is relatively increased in the lower part which is very liable to hit the ground surface, the durability of the face portion can be increased.

Also it is preferable that the weld bead is provided with the above-mentioned maximum width in a lower part under the sweet spot and a maximum width in an upper part above the sweet spot so that the resultant relatively wide upper and lower parts extend along the upper and lower edges of the face portion of the golf club head. In this case, due to the wide upper and lower parts, the weld joint strength is increased and the durability of the welding joint is increased.

Further, in this case, by limiting the extent in the toe-heel direction, of the wide upper and lower parts within a middle region of the face portion in the toe-heel direction, the middle region becomes relatively rigid, and accordingly the toe-side region and heel-side region of the face portion become relatively flexible. Therefore, the coefficient of restitution of the face portion becomes relatively low when the ball hits the central region, but relatively high when the ball hits the toe-side or heel-side region. As a result, it becomes possible to increase the carry distance of the ball when missed shot such that the ball hits the toe-side or heel-side region, while complying with the Rules of Golf which restricts the coefficient of restitution of the face portion.

DEFINITIONS

In this application including the description and claims, sizes, positions, directions and the like relating to the club head refer to those under a standard state of the club head unless otherwise noted.

The standard state of the club head is as shown in FIGS. 2-4 such that the club head 1 is set on a horizontal plane HP so that the center line CL of the club shaft (not shown) is inclined at the lie angle (beta) while keeping the club shaft center line CL on a vertical plane VP, and the club face 2 forms its loft angle (alpha) with respect to the horizontal plane HP. Incidentally, in the case of the club head alone, the center line of the shaft inserting hole (7*a*) can be used instead of the center line of the club shaft.

The sweet spot SS is as shown in FIGS. 2-3, the point of intersection between the club face 2 and a straight line N drawn normally to the club face 2 passing the center G of gravity of the head.

The toe-heel direction is a direction parallel with the horizontal plane HP and perpendicular to the front-back direction. The front-back direction is a direction parallel with the above-mentioned straight line N projected on the horizontal plane HP.

The width of the weld bead measured on the outer surface of the finished golf club head perpendicularly to the widthwise center line of the weld bead.

The undermentioned average width of the weld bead is defined by the area of the concerned part of the weld bead divided by the length of the widthwise center line of the concerned part. As a simple and easy way of determining the average width, the arithmetic mean value of the widths of the weld bead measured at constant intervals (for example 3 mm) along the longitudinal direction of the weld bead may be used, depending on the situation.

If the edge (2*a*-2*g*) of the club face 2 is unclear due to smooth change in the curvature, as shown in FIGS. 13-14, a virtual edge line (Pe) defined based on the curvature change is used instead as follows. In each cutting plane E1, E2—including the sweet spot SS and the center G of gravity of the head, a point Pe at which the radius (r) of curvature of the profile line Lf of the face portion first becomes under 200 mm in the course from the center SS to the periphery of the club face is determined. Then, the virtual edge line is defined as a locus of the points Pe.

BRIEF DESCRIPTION OF THE DRAWINGS

FIG. 7 shows the part corresponding to part X in FIG. 5 showing a state that the face member is temporarily supported in the front opening of the head main body before welded.

FIG. 12 shows the part same as that of FIG. 7 after welded.

DESCRIPTION OF THE PREFERRED EMBODIMENTS

Figure 1:
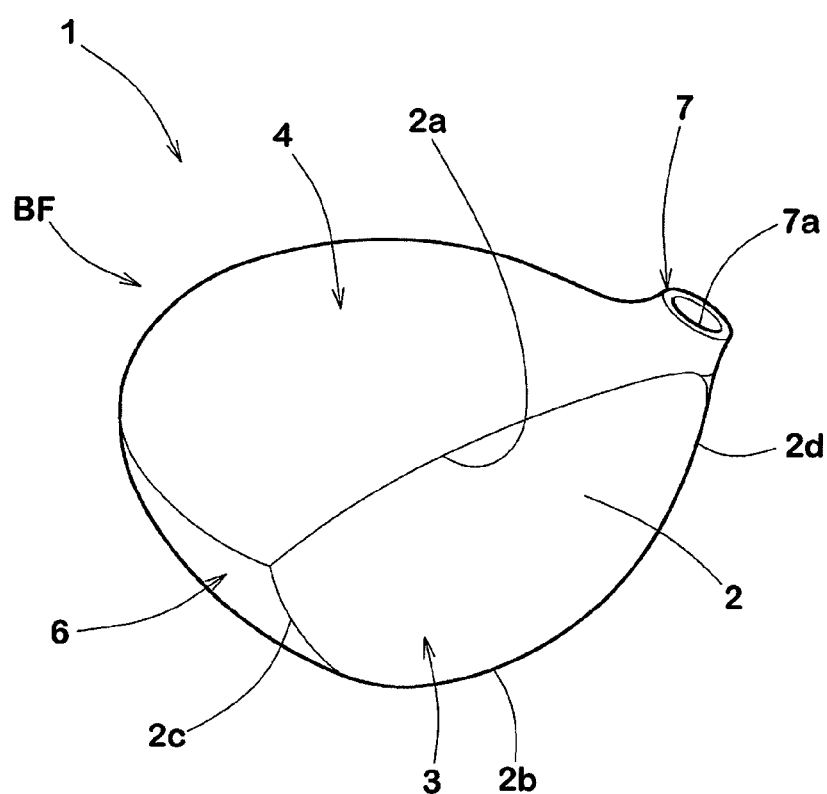
FIG. 1 is a perspective view of a golf club head according to the present invention.

Embodiments of the present invention will now be described in detail in conjunction with accompanying drawings.

In the drawings, golf club head 1 according to the present invention is a hollow head for a wood-type golf club such as driver (#1) or fairway wood.

Figure 2:
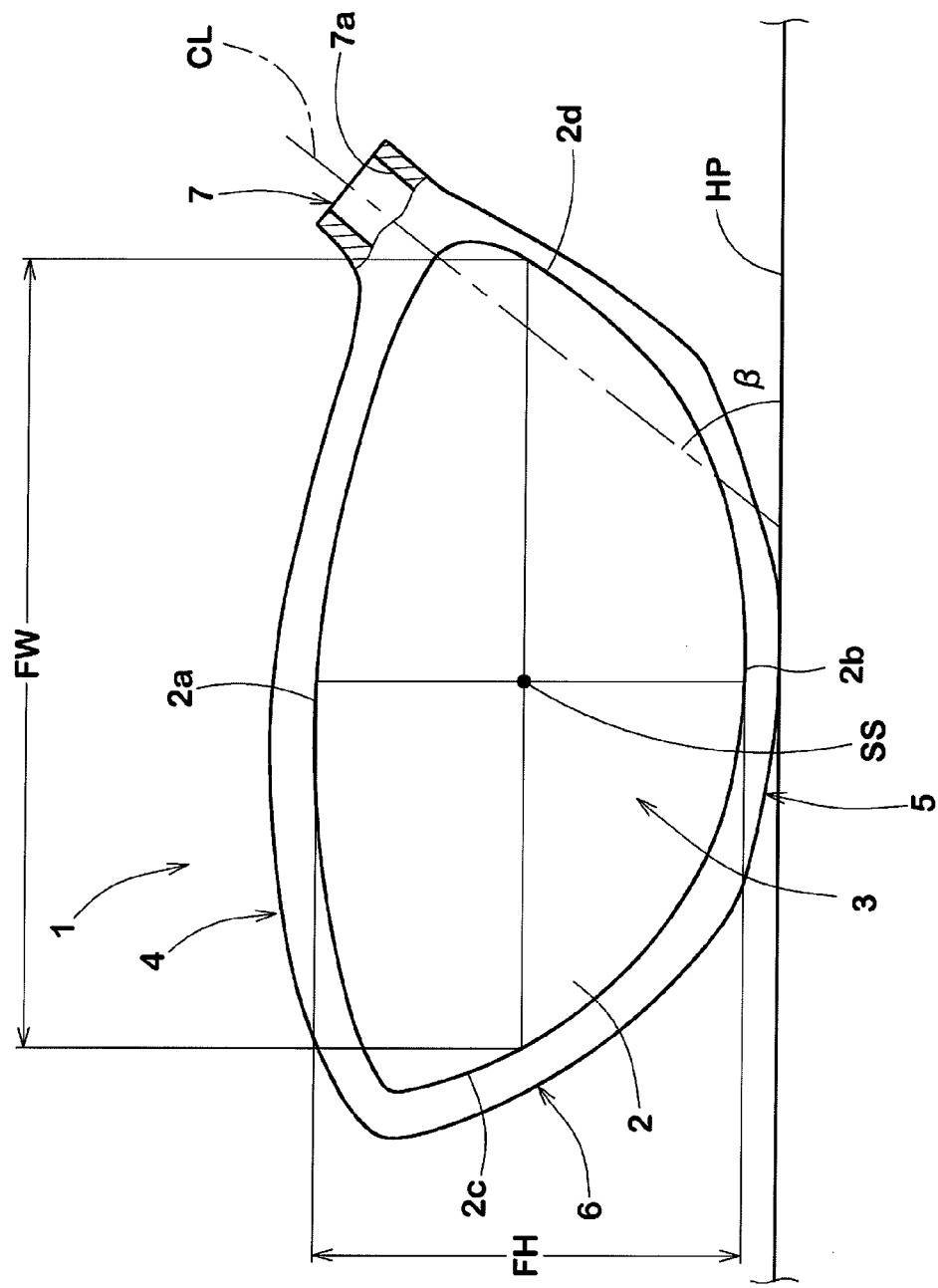
FIG. 2 is a front view of the golf club head.
Figure 3:
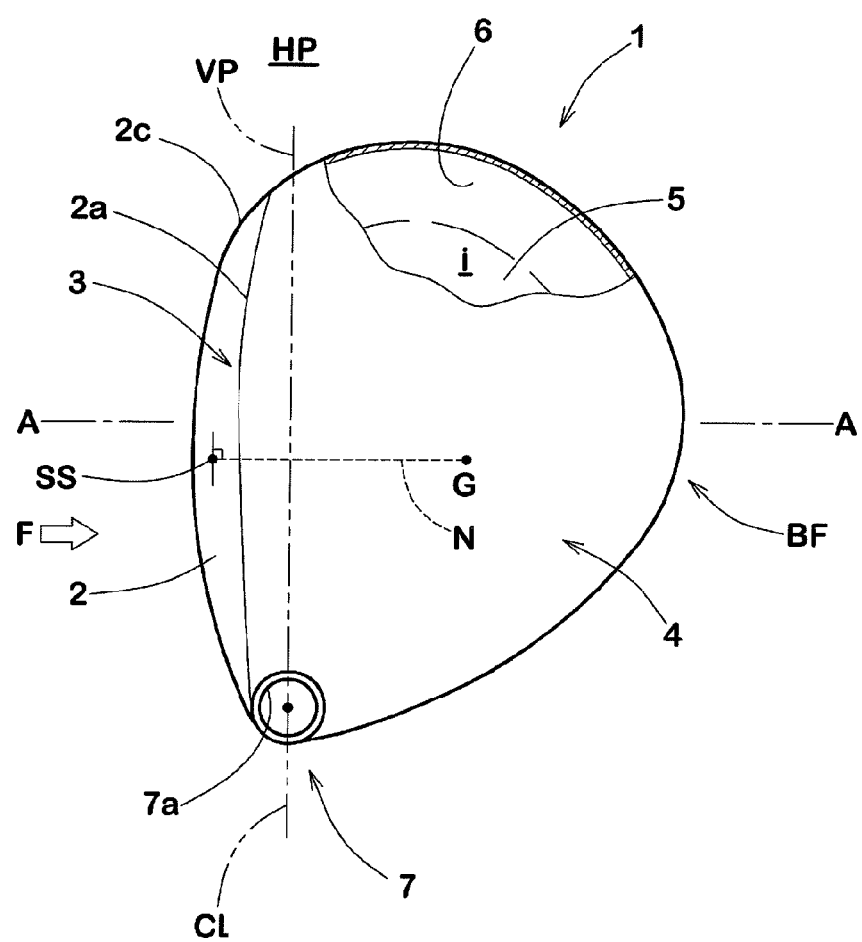
FIG. 3 is a top plan view of the golf club head.

As shown in FIGS. 1, 2 and 3, the golf club head 1 comprises: a face portion 3 whose front face defines a club face 2 for striking a ball; a crown portion 4 intersecting the club face 2 at the upper edge 2a thereof; a sole portion 5 intersecting the club face 2 at the lower edge 2b thereof; a side portion 6 between the crown portion 4 and sole portion 5 which extends from a toe-side edge 2c to a heel-side edge 2d of the club face 2 through the back face BF of the club head; and a hosel portion 7 at the heel side end of the crown to be attached to an end of a club shaft (not shown) inserted into the shaft inserting hole 7a. Thus, the club head 1 is provided with a hollow (i) and a shell structure with the thin wall.

The hollow (i) in this example is a closed void space, but it may be filled with a foamed plastic, separating from the backside of the face 3.

In the case of a wood-type club head for a driver (#1), it is preferable that the head volume is not less than 380 cc, more preferably not less than 400 cc, still more preferably not less than 420 cc in order to increase the moment of inertia and the depth of the center of gravity. However, to prevent an excessive increase in the club head weight and deteriorations of swing balance and durability and further in view of golf rules or regulations, the head volume is preferably not more than 500 cc, more preferably not more than 470 cc, still more preferably not more than 460 cc.

The mass of the club head 1 is preferably not less than 175 grams, more preferably not less than 180 grams, but not more than 220 grams, still more preferably not more than 215 grams. If the club head 1 is too lightweight, the user is hard to feel the weight of the club head during swing, therefore, it is difficult to achieve a correct timing of the golf swing. Further, there is a tendency to decrease the coefficient of restitution. If too heavy, on the other hand, it becomes difficult to follow through swing of the golf club, and the carry distance and flying direction of the ball tend to become worse.

Given that "FW" is a width of the club face 2 measured along the club face 2 within a horizontal plane passing through the sweet spot SS, and "FH" is a height of the club face 2 measured along the club face 2 in parallel with a vertical plane passing through the sweet spot SS, the face width FW is preferably set in a range of not less than 90.0 mm, more preferably not less than 92.0 mm, still more preferably not less than 95.0 mm, but not more than 110.0 mm, more preferably not more than 107.0 mm, still more preferably not more than 105.0 mm, and the face height FH is preferably set in a range of not less than 48.0 mm, more preferably not less than 50.0 mm, still more preferably not less than 52.0 mm, but not more than 60.0 mm, more preferably not more than 58.0 mm, still more preferably not more than 56.0 mm.

The contour shape of the club face 2 is longer in the toe-heel direction than in the crown-sole direction, namely, the ratio (FW/FH) is more than 1.0.

If the ratio (FW/FH) is less than 1.65, the center G of gravity of the head becomes high, and the ball launching angle and backspin are liable to decrease. As a result, the carry distance tends to decrease. If the ratio (FW/FH) is too large, there is a tendency that the coefficient of restitution is decreased to decrease the carry distance. Therefore, the ratio (FW/FH) is not less than 1.65, preferably not less than 1.70, more preferably not less than 1.80, but preferably not more than 2.10, more preferably not more than 2.05, still more preferably not more than 2.00.

Figure 4:
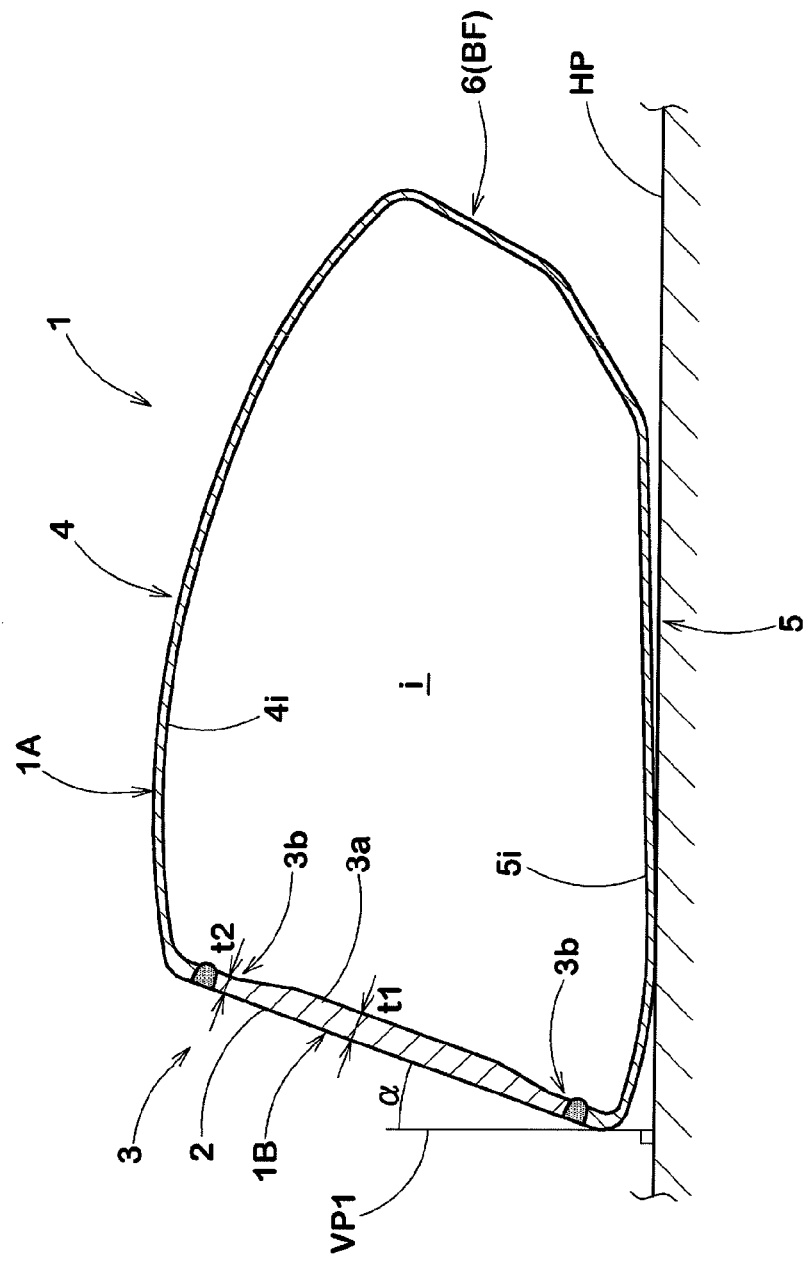
FIG. 4 is a cross sectional view taken along line A-A in FIG. 3.

As shown in FIG. 4, the face portion 3 is provided with a thicker central region 3a having a thickness t1 of not less than 3.10 mm, preferably not less than 3.25 mm in order to surely improve the durability of the face portion 3. If the thickness t1 becomes excessively increased, however, the weight of the face portion is increased. This induces deterioration in the rebound performance and a decrease in the depth of the center of gravity. As a result, there is a possibility that the directionality of the hit ball is deteriorated. Therefore, the thickness t1 is preferably not more than 4.00 mm, more preferably not more than 3.85 mm.

Around the central region 3a, the face portion is provided with a peripheral part 3b having a thickness less than that of the central region 3a. Such peripheral part 3b serves to improve the rebound performance, while keeping the durability of the face portion 3. In order to derive this function effectively, the thickness t2 of the peripheral part 3b is preferably not less than 1.80 mm, more preferably not less than 1.90 mm, but preferably not more than 2.50 mm, more preferably not more than 2.40 mm.

In this invention, the club head 1 is composed of a main body 1A having a front opening O, and a face member 1B welded to the main body 1A so as to close the front opening O.

Figure 5:
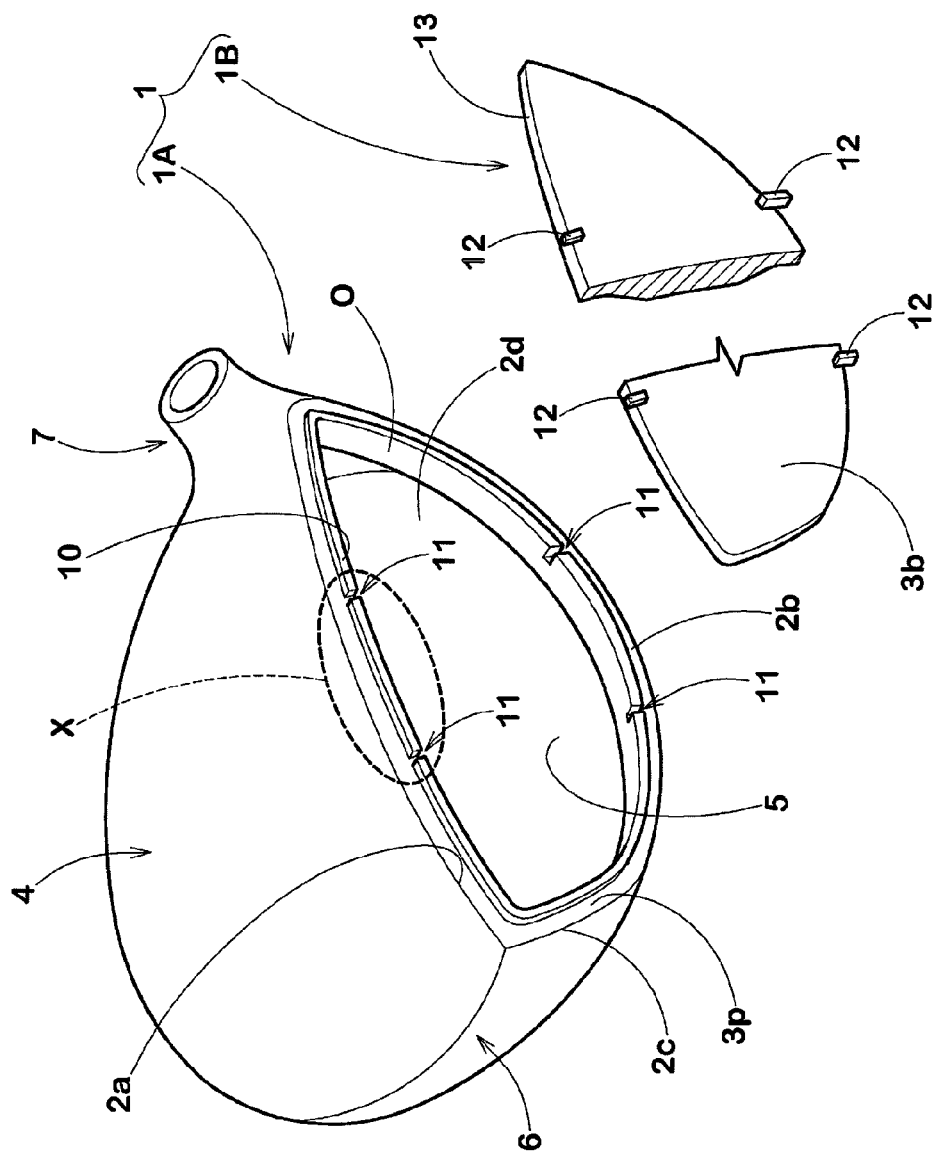
FIG. 5 is an exploded perspective view of the golf club head.

In this embodiment, as shown in FIG. 5, the edge of the front opening O is spaced apart from the edge 2a-2d of the club face 2 by a small distance. Accordingly, there is formed a peripheral edge zone 3p of the face portion 3 extending annularly around the front opening O with a narrow width. Thus, the main body 1A includes the peripheral edge zone 3p of the club face 2 around the front opening O and the above-mentioned crown portion 4, sole portion 5, side portion 6 and hosel portion 7.

The front opening O has a contour shape which is a substantially similar shape to that of the club face 2.

It is preferable that the entirety of the main body 1A is integrally formed by casting or the like. But, it is also possible to form the main body 1A by assembling and welding two or more parts prepared through appropriate methods such as forging, casting and press molding.

When welding the face member 1B to the main body 1A and welding two or more parts together into the main body, suitably employed is a welding method which can be achieved without using a welding rod such as laser welding and plasma welding.

The laser welding and plasma welding are preferable in that it is possible to minimize thermal effects on the vicinal area of the welded part, and it is relatively easy to control the width of the weld bead. In this embodiment, therefore, laser welding is employed.

In this embodiment, as shown in FIG. 5, the head main body 1A is integrally provided along the peripheral edge of the front opening O with a melting part 10. The melting part 10 is formed to be melted by the heat applied during welding and penetrate into the gap between the two parts welded.

The melting part 10 is a rib protruding forward with a small height. In this embodiment, the sectional shape of the melting part 10 is a rectangle, but various shapes, e.g. triangle, trapezoid, semicircle and the like can be employed.

The melting part 10 can be formed continuously around the front opening O. But, it is also possible to form the melting part 10 discontinuously around the front opening O to have at least one breaking part 11.

In this embodiment, the melting part 10 is discontinuously formed so as to have a plurality of breaking parts 11.

In this embodiment, as shown in FIG. 5, the face member 1B is a plate defining most of the face portion 3, and the plate has a contour shape almost same as, but slightly smaller than that of the front opening O. Thus, the face member 18 can be fitted into the front opening O, and between the edge surface 13 of the face member 1B and the inner surface of the front opening O of the head main body 1A, a narrow gap (j) in a range of for example 0.3 to 0.7 mm is formed.

Figure 6:
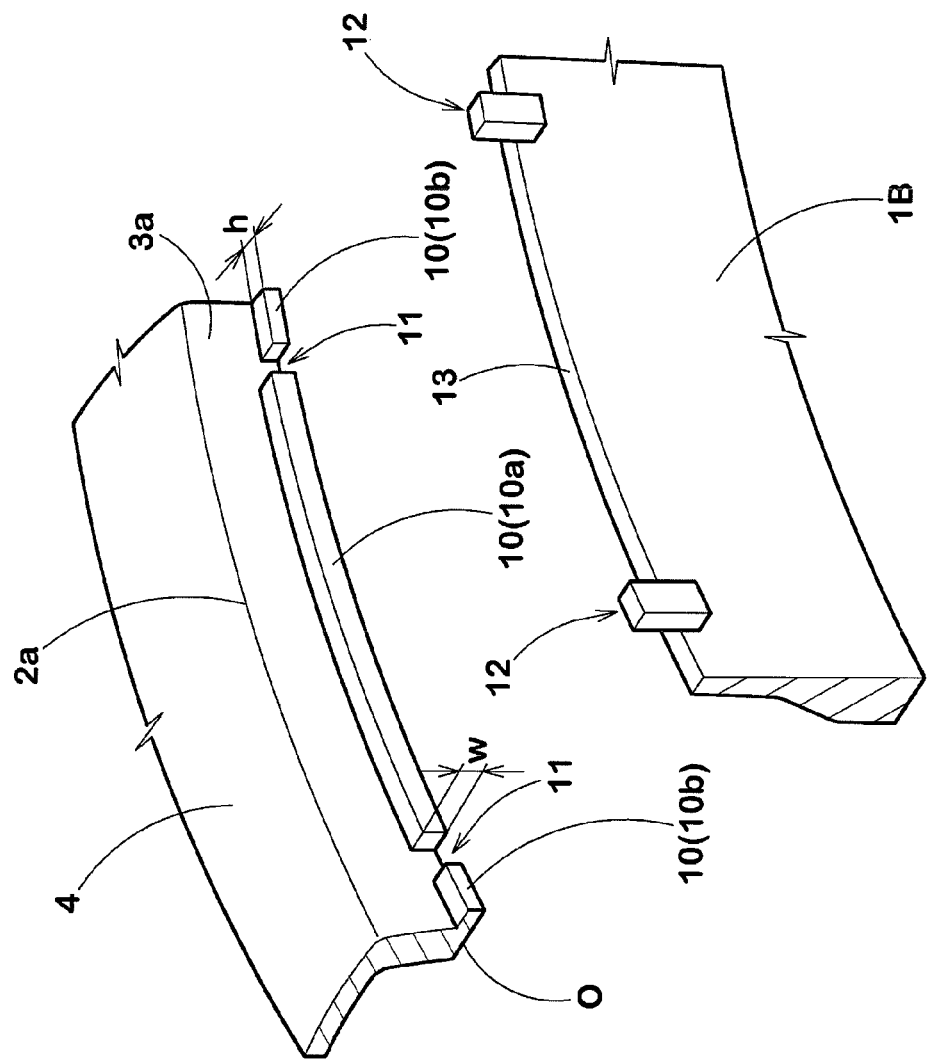
FIG. 6 is an enlarged perspective view showing part X in FIG. 5.

As shown in FIG. 5 and FIG. 6, in order to prevent the face member 1B from falling into the hollow (i) of the head main body 1A when the face member 1B is fitted into the front opening O, the face member 1B in this example is provided with a plurality of outside tabs 12.

The outside tab 12 is a small protrusion formed on the front surface (club face side) of the face member 1B integrally with the face member 1B so as to protrude radially from the above-mentioned edge surface 13 of the face member 1B.

In this embodiment, a plurality of the outside tabs 12 are formed at positions corresponding to the positions of the above-mentioned breaking parts 11 of the melting part 10 of the head main body 1A. Therefore, the outside tabs 12 contact with the outer surface of the peripheral edge zone 3p of the club face of the head main body 1A, and the face member 1B can be temporarily supported during welding.

since the outside tabs 12 are placed in the respective breaking parts 11 of the head main body 1B as shown in FIG. 7, the outside tabs 12 function as part of the melting part 10. In other words, the outside tabs 12 bridge the breaking parts 11 and form a substantially continuous melting part in cooperation with the melting part 10.

Aside from this arrangement, in order to support the back surface of the face member 1B when the face member 1B is fitted into the front opening O, the main body 1A may be provided along the edge of the front opening O with a plurality of inside tabs (discontinuous) or an inside flange (a single continuous tab) instead of the above-mentioned outside tabs 12. In this case, after the face member 1B is welded to the head main body 1A, the inside tabs/flange are remained inside the head with an additional weight. Therefore, basically, the above-mentioned outside tabs 12 are preferable to such inside tabs/flange because the outside tabs 12 are melted, and even if the outside tabs 12 remain after welded, it is easy to remove the outside tabs 12, for example, by grinding and polishing.

The head main body 1A and face member 1B have to be made from the same metal material or different metal materials which are weldable each other. For example, stainless steels, maraging steels, pure titanium, titanium alloys, aluminum alloys and the like can be suitably used alone or in a combination as far as weldable.

Figure 8:
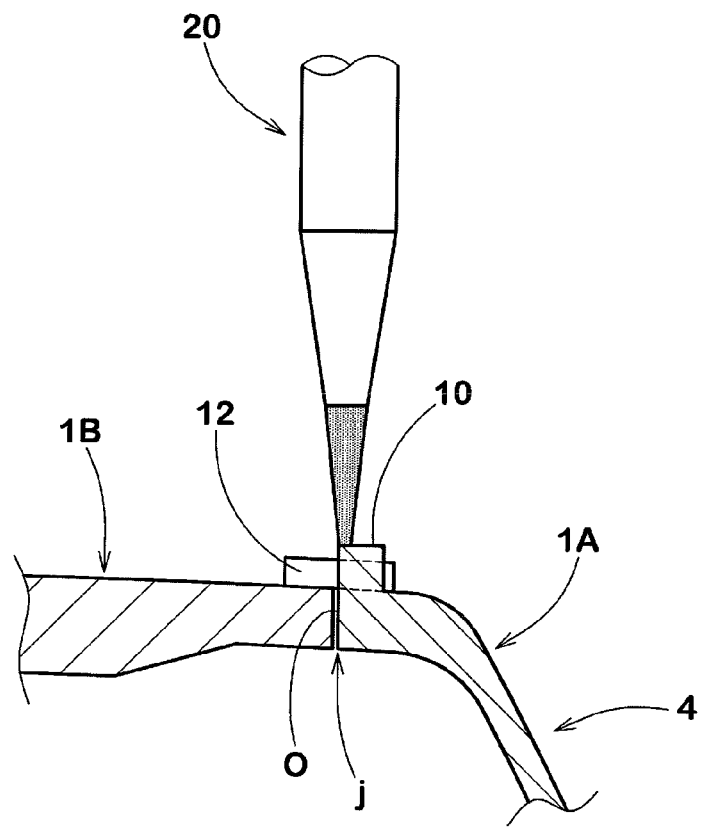
FIG. 8 and FIG. 9 are cross sectional views of the same part before and after laser welded.

FIG. 8 shows a process for laser welding employed in this embodiment.

In the welding process, in the state that the face member 1B is temporarily supported or fixed to the head main body 1A as shown in FIG. 8, the melting part 10 is irradiated with a laser beam generated in a welding energy irradiating device 20.

For example, the welding energy irradiating device 20 is mounted on a three-dimensionally-moving device (not shown), which can move the irradiating device 20 three-dimensionally according to a control program stored therein beforehand so that the welding energy is applied to the above-mentioned melting part 10 at the predetermined moving speed along the predetermined path.

Figure 9:
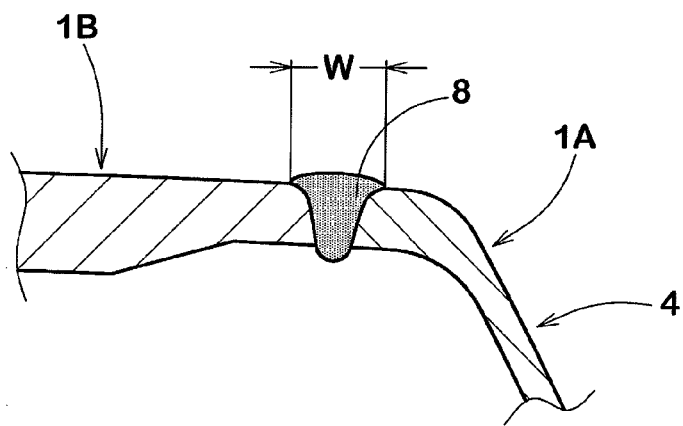

By the heat of the laser beam, the melting part 10 is melted and, due to the capillary action, the melted metal penetrates into the gap (j) between the edge surface 13 of the face member 1B and the front opening O of the head main body 1A, and then gets hard. Thus, as shown in FIG. 9, a weld bead 8 is formed along the junction between the face member 1B and the head main body 1A.

Figure 10:
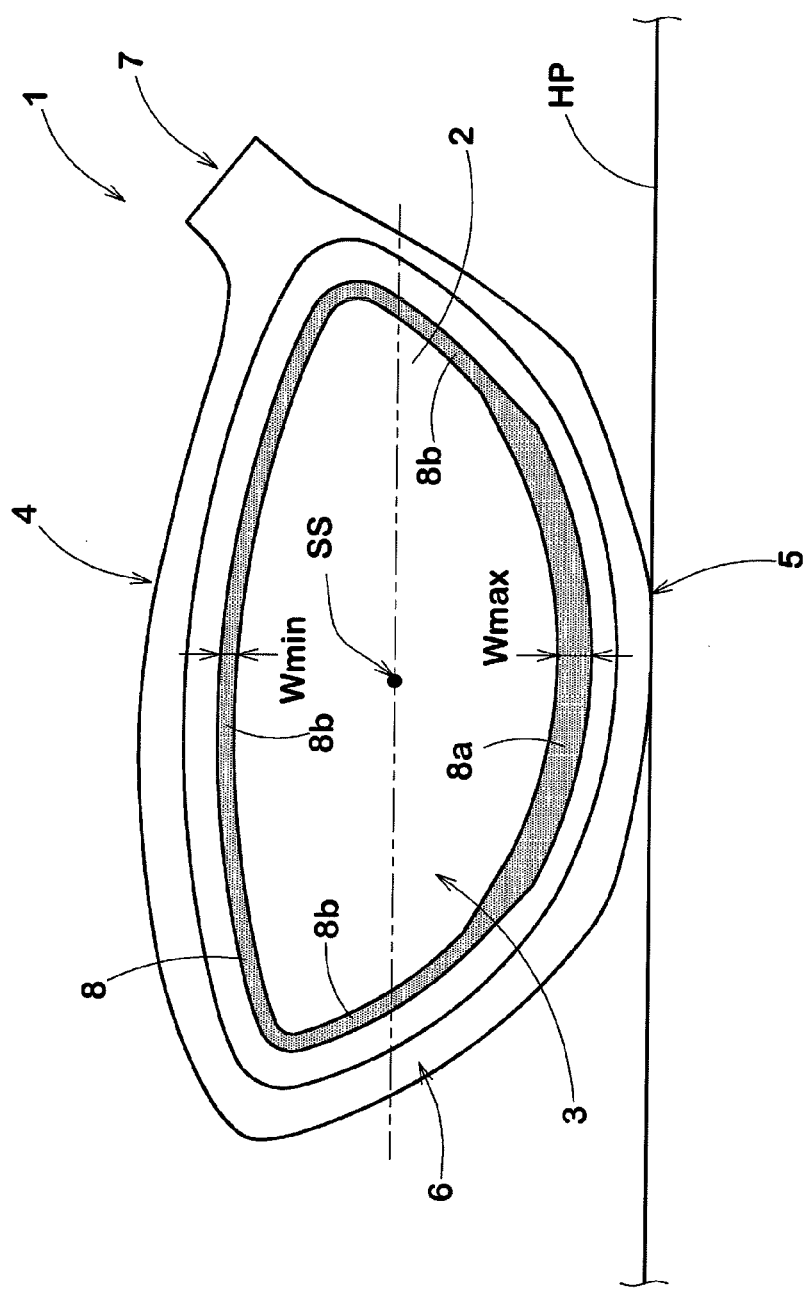
FIG. 10 and FIG. 11 each show an example of the variation of the width of the weld bead.
Figure 11:
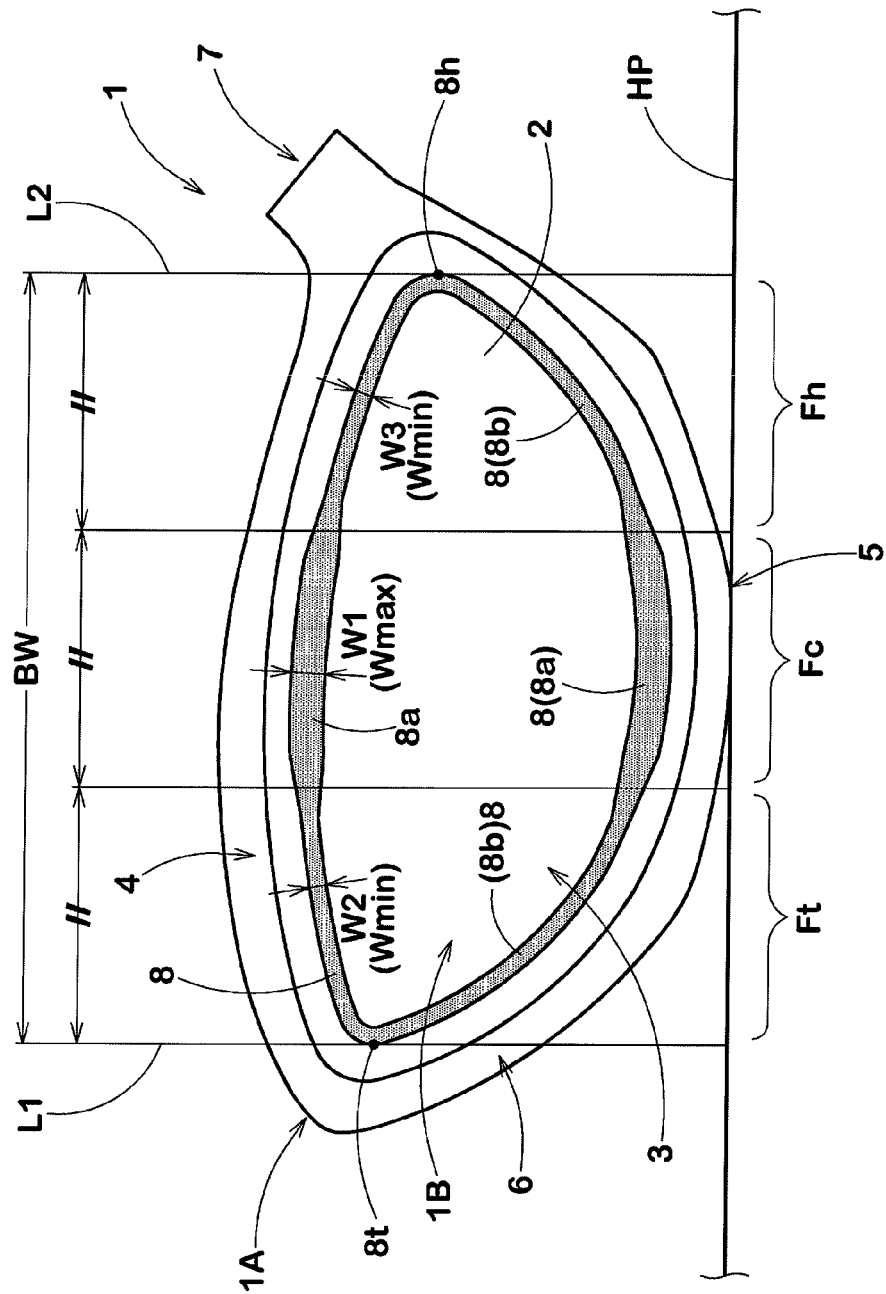
Figure 13:
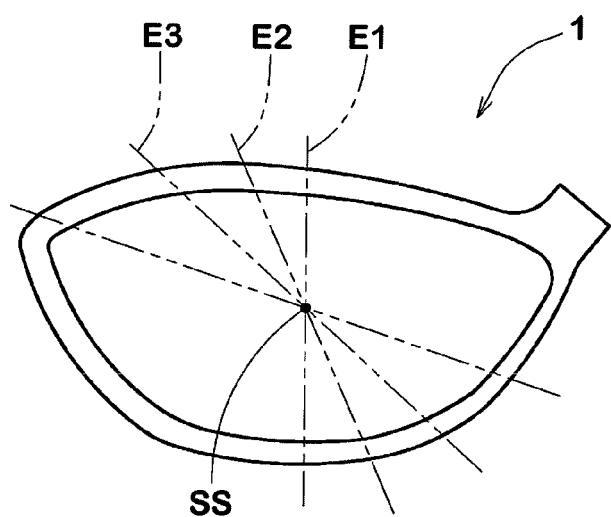
FIGS. 13 and 14 are a front view and a cross sectional view of a face portion for explaining the definition of the edge of the club face.
Figure 14:
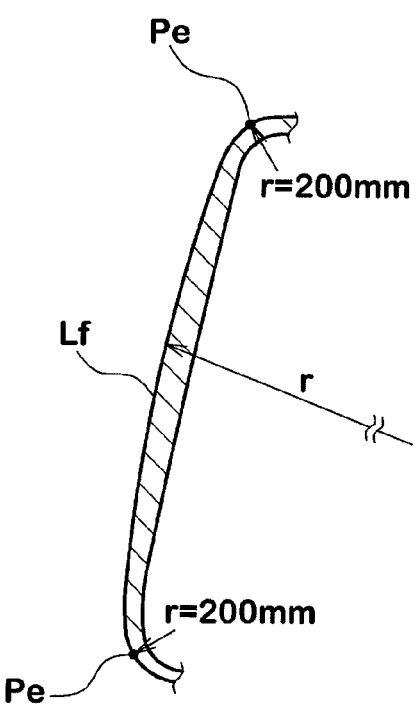

In the welding process, for example as shown in FIG. 10 and FIG. 11, the width W of the weld bead 8 is intentionally varied such that the width W is relatively increased in a portion where it is desirous of relatively increasing the rigidity and/or weight, but the width W is relatively decreased in a portion where it is desirous of relatively decreasing the rigidity and/or weight.

As one of methods for changing the width W of the weld bead 8, the sectional area of the melting part 10 can be changed as shown in FIG. 7 for example. Specifically, the sectional area is increased (forming a large melting part 10a) in the portion where it is desirous of increasing the rigidity and/or weight, and the sectional area is decreased (forming a small melting part 10b) in the portion where it is desirous of decreasing the rigidity and/or weight.

As shown in FIG. 12 which shows the same part as FIG. 7 after welded, by melting the large melting part 10a, a relatively large weld bead width W can be obtained, and by melting the small melting part 10b, a relatively small weld bead width W can be obtained.

Namely, the width W of the weld bead 8 is almost proportionate to the volume of the metal melted during welding.

Incidentally, it was discovered through experiments made by the inventor that, in the case that the sectional area of the melting part 10 is varied as above, even when a laser beam of a constant power is irradiated at a constant speed along the melting part 10, the width of the weld bead can be changed as desired as explained above.

It is preferable that, regardless of the large melting part 10a and small melting part 10b, the melting part 10 has a protruding height (h) in a range of from 0.5 mm to 3.0 mm, and a width (w) in a range of from 1.0 mm to 3.5 mm.

Aside from varying the cross sectional area of the melting part 10, the power (energy) of the laser beam and/or the speed of moving the laser beam along the melting part can be changed as another method for changing the width W of the weld bead 8. Specifically, in the portion where it is desirous of relatively increasing the width W of the weld bead 8, in order to relatively increase the volume of the melted metal, the power of the laser beam is relatively increased, and/or the speed of moving the laser beam is relatively decreased.

In the portion where it is desirous of relatively decreasing the width W of the weld bead 8, in order to relatively decrease the volume of the melted metal, the power of the laser beam is relatively decreased, and/or the speed of moving the laser beam is relatively increased.

In the case that the metal materials to be welded are a titanium alloy having a thickness of 1.0 to 2.5 mm, it is preferable that the power of the laser beam is in a range of 1200 to 2750 watts, and the speed of moving the laser beam is in a range of 700 to 1000 mm/min along the path, namely the melting part. When this method is employed, the melting part 10 may have either a substantially constant sectional area or a variable sectional area as explained above.

Through the above-mentioned welding process, an annularly continuously extending weld bead 8 is formed in the club face 2 as shown in FIG. 10 and FIG. 11.

After the welding process, in order to remove a part of the weld bead 8 protruding from the club face 2 and/or a remaining part of the melting part 10, grinding and polishing operations are made.

The difference (Wmax−Wmin) between the maximum width Wmax and the minimum width Wmin of the weld bead 8 is set to be not less than 1 mm, more preferably not less than 1.4 mm, still more preferably not less than 1.9 mm, but preferably not more than 6.0 mm, more preferably not more than 4.0 mm.

By providing a large variation in the width of the weld bead 8, the weight distribution and rigidity distribution in the face portion can be rearranged easily. Specifically, a wider part 8a having a larger width W is formed in a portion where it is desirous of relatively increasing the weight and rigidity. In a portion where it is desirous of relatively decreasing the weight and rigidity, a narrower part 8a having a smaller width W is formed.

Preferably, the difference (Wmax−Wa) between the above-mentioned maximum width Wmax and the average width Wa of the weld bead 8 is not less than 1 mm. However, if the difference (Wmax−Wa) is excessively increased, there is a possibility that the production efficiency is decreased, or the welding strength is decreased. Therefore, the difference (Wmax−Wa) is preferably not more than 4.5 mm, more preferably not more than 3.5 mm, still more preferably not more than 2.5 mm.

Also, the difference (Wa−Wmin) between the average width Wa and the minimum width Wmin of the weld bead 8 is preferably not less than 1 mm. However, if the difference (Wa−Wmin) is excessively increased, there is a possibility that the welding strength is decreased, therefore, the difference (Wa−Wmin) is preferably not more than 4.5 mm, more preferably not more than 3.5 mm, still more preferably not more than 2.5 mm.

Further, it is preferable that the width satisfy the following condition: (Wmax−Wa)−(Wa−Wmin)>0

In the example shown in FIG. 10, in order to lower the center G of gravity of the head, the weld bead 8 is provided with the wider part 8a having the maximum width Wmax under the sweet spot SS only, and the rest is formed as the narrow part 8b having the minimum width Wmin. The wider part 8a extends along the sole portion 5. The narrow part 8b extends along the crown portion 4 and the side portion 6 on both the toe-side and heel-side.

The lower part of the face portion is liable to hit the ground surface. In this design, due to the wider part 8a, the strength of the lower part is increased, and the durability of the face portion can be improved.

In the example shown in FIG. 11, a wider part 8a having a relatively high rigidity is formed in a middle region Fc of the club face 2 in the toe-heel direction, and a narrow part 8b having a relatively low rigidity is formed in each of a toe-side region Ft and a heel-side region Fh of the club face 2.

In this example, the wider part 8a is formed on both the upper side and under side of the sweet spot SS.

Thus, the rigidity of the middle region Fc of the club face 2 is increased, and it is possible to control an excessive increase in the coefficient of restitution so as to comply with the Rules of Golf. On the other hand, the rigidity of the toe-side region Ft and heel-side region Fh of the club face 2 is relatively decreased. As a result, even if the golfer is missed shot such that the ball hits the toe-side region Ft or heel-side region Fh, the decrease in the carry distance from good shots can be minimized.

The above-mentioned middle region Fc, toe-side region Ft and heel-side region Fh of the club face 2 correspond to a middle region, a toe-side region and a heel-side region which are obtained by trisecting the width in the toe-heel direction between a toe-side vertical line L1 passing the toe-side extreme end 8t of the weld bead 8 and a heel-side vertical line L2 passing the heel-side extreme end 8h of the weld bead 8 in the front view of the golf club head 1.

In this example, the average width W1 of the weld bead 8 extending in the middle region Ft is preferably set in a range of not less than 3.0 mm, more preferably not less than 3.2 mm, still more preferably not less than 3.3 mm, but not more than 7.0 mm, more preferably not more than 6.8 mm, still more preferably not more than 6.7 mm.

If the average width W1 is less than 3.0 mm, the durability of the welding joint is liable to become insufficient, and further there is a possibility that the spring effect at the time of good shots such that the ball hits the sweet spot Ss or vicinity thereto can not comply with the Rules of Golf. If the average width W1 is more than 7.0 mm, it results in unwanted decrease in the spring effect at the time of good shots.

The average widths W2 and W3 of the weld bead 8 extending in the toe-side region Ft and heel-side region Fh, respectively, are preferably set in a range of not less than 1.5 mm, more preferably not less than 1.6 mm, still more preferably not less than 1.7 mm, but not more than 3.5 mm, more preferably not more than 3.4 mm, still more preferably not more than 3.3 mm. If the average width W2, W3 is less than 1.5 mm, it is difficult to secure the necessary durability. If the average width W2, W3 is more than 3.5 mm, the rigidity is increased in the toe-side region Ft and heel-side region Fh, the carry distance at the time of miss shot decreases.

The ratio (W1/W2) of the average width W1 of the weld bead 8 in the middle region Fc to the average width W2 of the weld bead 8 in the toe-side region Ft is preferably set in a range of not less than 1.4, more preferably not less than 1.5, still more preferably not less than 1.6, but not more than 3.5, more preferably not more than 3.4, still more preferably not more than 3.3.

The ratio (W1/W3) of the average width W1 of the weld bead 8 in the middle region FC to the average width Ws of the weld bead 8 in the heel-side region Fh is preferably set in a range of not less than 1.4, more preferably not less than 1.5, still more preferably not less than 1.6, but not more than 3.5, more preferably not more than 3.4, still more preferably not more than 3.3.

If the ratio (W1/W2), (W1/W3) is less than 1.4, it becomes difficult to control an excessive increase in the coefficient of restitution at the time of good shots or it becomes difficult to increase the coefficient of restitution at the time of miss shots. If the ratio (W1/W2), (W1/W3) is more than 3.5, the durability is liable to becomes insufficient.

In the above-mentioned embodiment, the face member 1B is a plate which is almost flat and fitted into the front opening such that the edge surface 13 almost contacts with the inner surface of the front opening O. But, it is also possible to provide such design that the face member 1B is a plate which is almost flat and disposed over the front opening such that the edge surface 13 forms a part of the outer surface of the head, and the peripheral edge part of the back surface of the face member 1B contacts with the front of the main body and welded thereto.

Further, aside from the almost flat plate, the face member 1B can be a so called cup-type provided with a turnback along the edge of the face portion so that the turnback forms a front part of at least one of the crown portion 4, sole portion 5 and side portion 6.

As described above, the present invention is suitably applied to wood-type golf club heads. But, it is also possible to apply the present invention to utility-type golf club heads, iron-type golf club heads and the like as far as the main body has a front opening or hollow.

Comparison Tests wood-type golf club heads (head volume 460 cc, lie angle 57.5 degrees, loft angle 11.5 degrees, mass 190.0 g) having the width variation shown in FIG. 11 and specifications shown in Table 1 were prepared and tested.

The head main body was formed from a titanium alloy Ti-6Al-4V through a lost-wax precision casting process. The sectional shape of the melting part was a rectangle. The face member was formed by: laser cutting a rolled sheet of a titanium alloy Ti-6Al-4V; CNC-end-milling the back surface of the cut-out piece to form a thick central part having a thickness of 3.50+/−0.05 mm and a thin peripheral part having a thickness of 2.10+/−0.05 mm; and press molding the piece to provide a curvature for the face member.

Then, the face member was laser welded to the head main body.

Restitution Coefficient Test

According to the "Procedure for Measuring the Velocity Ratio of a Club Head for Conformance to Rule 4-1e, Appendix II, Revision 2 (Feb. 8, 1999), United States Golf Association", the restitution coefficient of each club head was measured at three measuring positions: the sweet spot SS, a toe-side position spaced apart from the sweet spot toward the toe by 20 mm, and a heel-side position spaced apart from the sweet spot toward the heel by 20 mm.

The values obtained from the three measuring positions are indicated in Table 1 by an index based on the value obtained from the sweet spot SS being 100, wherein the larger value is better.

Durability Test

Each head was attached to a carbon shaft (SRI sports Ltd. SV-3003J, Flex X) to make a 45-inch #1 wood, and the golf club was mounted on a swing robot. Then, the head hit golf balls at the sweet spot 10000 times (maximum) at the head speed of 54 meter/second, while checking the weld junction every 100 times with the naked eye until any damage was found.

The results are shown in Table 1, wherein "A" means that no damage was found after the 10000-time hitting test, and numerical values mean the number of hitting times at which the damage was found.

From the test results, it was confirmed that in the case of the golf club heads according to the present invention the decrease in the rebound performance when missed shots becomes small. Further, it was confirmed that Examples 1 to 5 were excellent at the durability. In the case of Examples 6 and 7, the decrease in the rebound performance when missed shot became very small, but the durability was not so good. It is presumed that the weld bead in the toe-side and heel-side regions became under the overload due to the W1/W2 values outside the preferable range.

TABLE 1

| Head | Ex. 1 | Ex. 2 | Ex. 3 | Ex. 4 | Ex. 5 | Ex. 6 | Ex. 7 | Ref. |
|---|---|---|---|---|---|---|---|---|
| Toe-side and heel-side regions | | | | | | | | |
| laser beam power (W) | 1750 | 1450 | 1200 | 1650 | 1650 | 1300 | 1750 | — |
| laser beam moving speed (mm/min) | 950 | 950 | 1000 | 870 | 870 | 1100 | 950 | — |
| melting part height (h) (mm) | 2 | 2 | 2 | 1.5 | 1.5 | 2 | 1 | — |
| melting part width (w) (mm) | 1.5 | 1.5 | 1.5 | 1.5 | 1 | 1.5 | 1 | — |
| weld bead width W2 = W3 (mm) | 3.1 | 2.3 | 1.5 | 2.5 | 1.8 | 1.0 | 1.2 | 5.7 |
| Middle region | | | | | | | | |
| laser beam power (W) | 2350 | 2600 | 2350 | 1650 | 1650 | 2350 | 2350 | — |
| laser beam moving speed (mm/min) | 850 | 850 | 850 | 870 | 870 | 850 | 850 | — |
| melting part height (h) (mm) | 2 | 2 | 2 | 2.5 | 3 | 2 | 2 | — |
| melting part width (w) (mm) | 1.5 | 1.5 | 1.5 | 2.3 | 2.5 | 1.5 | 1.5 | — |
| weld bead width W1 (mm) | 4.5 | 6.2 | 4.5 | 4.4 | 5.8 | 4.5 | 4.5 | 5.7 |
| W1/W2 ratio | 1.5 | 2.7 | 3.0 | 1.8 | 3.2 | 4.5 | 3.8 | 1.0 |
| Weld bead width | | | | | | | | |
| average Wa (mm) | 3.5 | 4.3 | 2.8 | 3.4 | 2.5 | 2.7 | 3.0 | 5.7 |
| maximum Wmax (mm) | 4.5 | 6.2 | 4.5 | 4.4 | 5.8 | 4.5 | 4.5 | 5.7 |
| minimum Wmin (mm) | 3.1 | 2.3 | 1.5 | 2.5 | 1.8 | 1.0 | 1.2 | 5.7 |
| Wmax-Wa (mm) | 1.0 | 1.9 | 1.7 | 1.0 | 3.3 | 1.8 | 1.5 | 0 |
| Wmax-Wmin (mm) | 1.4 | 3.9 | 3.0 | 1.9 | 4.0 | 3.5 | 3.3 | 0 |
| Wa-Wmin (mm) | 0.4 | 2.0 | 1.3 | 0.9 | 0.7 | 1.7 | 1.8 | 0 |
| Restitution coefficient | | | | | | | | |
| sweet spot | 100 | 100 | 100 | 100 | 100 | 100 | 100 | 100 |
| toe-side position | 75 | 78 | 81 | 76 | 80 | 85 | 83 | 70 |
| heel-side position | 65 | 69 | 72 | 65 | 72 | 75 | 74 | 60 |
| Durability | A | A | A | A | A | 6300 | 7800 | A |

The invention claimed is:

1. A golf club head having a club face for striking a ball and comprising:
    a hollow main body provided with a front opening, and
    a face member disposed at the front of the main body so that a front surface thereof forms at least a major part of the club face, and a rear surface thereof faces a hollow of the main body, wherein
    a peripheral edge of the face member is welded to the main body so as to form a weld bead,
    the weld bead extends annularly passing through an upper region and a lower region of the club face,
    the width of the weld bead is changed so that a difference (Wmax−Wmin) between the maximum width Wmax and minimum width Wmin is not less than 1 mm, and
    the width of the weld bead is increased in the lower region in comparison with the upper region.

2. A method for manufacturing the golf club head as set forth in claim 1, comprising the steps of:
    holding the face member in the front opening of the main body so that the edge surface the face member faces to the inner surface of the front opening; and
    welding the face member to the main body by applying a heat energy, forming the weld bead therebetween,
    wherein the step of welding the face member to the main body includes: changing the width of the weld bead by changing the heat energy applied to a targeted part.

3. The method according to claim 2, wherein the changing of the heat energy is achieved by changing the power of the heat energy and/or a speed of applying the heat energy.

4. The method according to claim 3, wherein the welding is a laser welding or a plasma welding.

5. A method for manufacturing the golf club head as set forth in claim 1, comprising steps of:
    holding the face member in the front opening of the main body so that the edge surface the face member faces to the inner surface of the front opening, and
    welding the face member to the main body by applying a heat energy, forming a weld bead therebetween,
    wherein the width of the weld bead is changed by changing the sectional area of a melting part, the melting part is applied to said heat energy during welding to be melted and bridge a gap between the face member and the main body, and the melting part is formed on at least one of the face member and the head main body so as to extend continuously or discontinuously along said gap.

6. The method according to claim 5, wherein the welding is a laser welding or a plasma welding.

7. The golf club head according to claim 1, wherein the weld bead includes a wide part whose width is at least 1 mm larger than an average width Wa of the weld bead.

8. The golf club head according to claim 1, wherein the weld bead includes a narrow part whose width is at least 1 mm smaller than the average width Wa of the weld bead.

9. The golf club head according to claim 1, wherein the weld bead includes a wide part whose width is at least 1 mm larger than an average width Wa of the weld bead, and a narrow part whose width is at least 1 mm smaller than the average width Wa of the weld bead.

10. The golf club head according to claim 1, wherein the weld bead extends annularly within the club face.

11. A golf club head having a club face for striking a ball and comprising:
    a hollow main body provided with a front opening, and
    a face member disposed at the front of the main body so that a front surface thereof forms at least a major part of the club face, and a rear surface thereof faces a hollow of the main body, wherein
    a peripheral edge of the face member is welded to the main body so as to form a weld bead,
    the weld bead extends annularly passing through a toe-side region, a heel-side region and an in-between middle region of the club face,
    the width of the weld bead is changed so that a difference (Wmax−Wmin) between the maximum width Wmax and minimum width Wmin is not less than 1 mm, and
    the width of the weld bead is increased in the middle region in comparison with the toe-side region and the heel-side region.

12. The golf club head according to claim 11, wherein a maximum width W1 of the weld bead in the middle region is in a range of 1.4 to 3.5 times a maximum width W2 of the weld bead in the toe-side region.

13. The golf club head according to claim 11, wherein a maximum width W1 of the weld bead in the middle region is in a range of 1.4 to 3.5 times a width W3 of the weld bead in the heel-side region.

14. The golf club head according to claim 11, wherein the weld bead includes a wide part whose width is at least 1 mm larger than an average width Wa of the weld bead.

15. The golf club head according to claim 11, wherein the weld bead includes a narrow part whose width is at least 1 mm smaller than the average width Wa of the weld bead.

16. The golf club head according to claim 11, wherein the weld bead includes a wide part whose width is at least 1 mm larger than an average width Wa of the weld bead, and a narrow part whose width is at least 1 mm smaller than the average width Wa of the weld bead.

17. The golf club head according to claim 11, wherein the weld bead extends annularly within the club face.

18. A method for manufacturing the golf club head as set forth in claim 11, comprising steps of:
    holding the face member in the front opening of the main body so that the edge surface the face member faces to the inner surface of the front opening; and
    welding the face member to the main body by applying a heat energy, forming the weld bead therebetween,
    wherein the step of welding the face member to the main body includes: changing the width of the weld bead by changing the heat energy applied to a targeted part.

19. A method for manufacturing the golf club head as set forth in claim 11, comprising steps of:
    holding the face member in the front opening of the main body so that the edge surface the face member faces to the inner surface of the front opening, and
    welding the face member to the main body by applying a heat energy, forming a weld bead therebetween,
    wherein the width of the weld bead is changed by changing the sectional area of a melting part, the melting part is applied to said heat energy during welding to be melted and bridge a gap between the face member and the main body, and the melting part is formed on at least one of the face member and the head main body so as to extend continuously or discontinuously along said gap.

* * * * *